United States Patent
Bauer

(10) Patent No.: US 8,552,127 B2
(45) Date of Patent: Oct. 8, 2013

(54) METHOD FOR THE PRODUCTION OF TERPOLYMERS BASED ON VDF, TRFE AND CFE, OR CTFE

(75) Inventor: Francois Bauer, Saint Louis (FR)

(73) Assignee: Piezotech, Hesingue (FR)

( * ) Notice: Subject to any disclaimer, the term of this patent is extended or adjusted under 35 U.S.C. 154(b) by 0 days.

(21) Appl. No.: 13/269,124

(22) Filed: Oct. 7, 2011

(65) Prior Publication Data

US 2012/0116039 A1 May 10, 2012

Related U.S. Application Data

(63) Continuation of application No. PCT/FR2010/050688, filed on Apr. 9, 2010.

(30) Foreign Application Priority Data

Apr. 9, 2009 (FR) ...................................... 09 01751

(51) Int. Cl.
*C08F 14/22* (2006.01)

(52) U.S. Cl.
USPC .............................. 526/88; 526/249; 526/255

(58) Field of Classification Search
USPC .............................. 526/88, 249, 255; 525/276
See application file for complete search history.

(56) References Cited

U.S. PATENT DOCUMENTS

| | | | | |
|---|---|---|---|---|
| 3,163,628 A * | 12/1964 | Bolstad | ............................ | 526/68 |
| 3,839,305 A * | 10/1974 | Moore | ............................ | 526/65 |
| 4,554,355 A * | 11/1985 | Musser | ........................ | 548/180 |
| 5,087,679 A | 2/1992 | Inukai et al. | | |
| 5,095,081 A * | 3/1992 | Bacque et al. | ................. | 526/216 |
| 6,355,749 B1 * | 3/2002 | Chung et al. | ................... | 526/255 |
| 6,787,238 B2 * | 9/2004 | Zhang et al. | .................... | 428/421 |
| 7,750,098 B2 * | 7/2010 | Baras et al. | ..................... | 526/249 |
| 2004/0034164 A1 * | 2/2004 | Melchiors et al. | ............. | 524/608 |
| 2007/0166838 A1 * | 7/2007 | Marsman et al. | .................. | 438/3 |
| 2007/0167590 A1 | 7/2007 | Baras et al. | | |

OTHER PUBLICATIONS

Klein, R., Influence of Crystallization Conditions on the Microstructure and Electrochemical Properties of Poly(vinylidene fluoride-trifluoroethylene-chloroethylene) Terpolymers, Macromolecules, 2003, 36, pp. 7220-7226.*

Bauer, F., et al., "Ferroelectric Copolymers and Terpolymers for Electrostrictors: Synthesis and Properties", IEEETransaction on Dielectric and Electrical Insulation, vol. 11, 2004, pp. 293-298.

* cited by examiner

*Primary Examiner* — Nicole M Buie-Hatcher

(74) *Attorney, Agent, or Firm* — Millen, White, Zelano & Branigan, P.C.

(57) ABSTRACT

A process for manufacturing terpolymers by polymerization of VDF (vinylidene difluoride), TrFE (trifluoroethylene), and CFE (1-chloro-1-fluoroethylene) or CTFE (chlorotrifluoroethylene) monomers in the presence of a radical polymerization initiator, characterized in that:

i) an initial mixture of VDF and of TrFE, free of CFE and of CTFE, is fed into an autoclave, ii) the initiator mixed with water is injected into the autoclave so as to achieve, inside the autoclave, a pressure at least equal to 80 bar, in order to form a suspension of VDF and TrFE monomers in water, iii) a secondary mixture constituted of VDF, TrFE and CFE or CTFE is injected into the autoclave, then iv) as soon as the polymerization reaction starts, said secondary mixture is reinjected continuously into the reactor, so as to maintain therein a constant pressure of at least 80 bar.

13 Claims, 1 Drawing Sheet

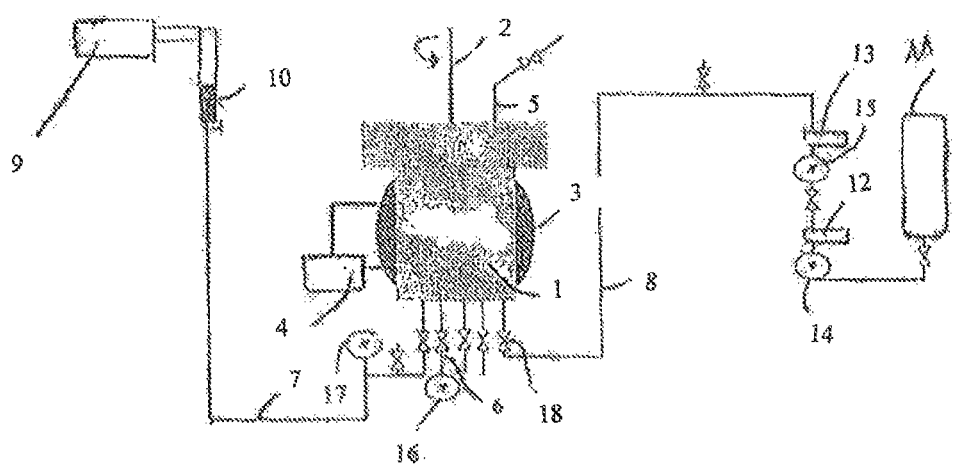

METHOD FOR THE PRODUCTION OF TERPOLYMERS BASED ON VDF, TRFE AND CFE, OR CTFE

This application is a continuation of PCT/FR2010/050688, filed Apr. 9, 2010, from which priority is claimed under 35 U.S.C. §365(c) and §120. This application also claims benefit to priority, under 35 U.S.C. §119 of French patent applications FR 0901751, filed Apr. 9, 2009.

FIELD OF THE INVENTION

The present invention relates to a process for manufacturing terpolymers by polymerization of VDF (vinylidene difluoride), TrFE (trifluoroethylene), and CFE (1-chloro-1-fluoroethylene) or CTFE (chlorotrifluoroethylene) monomers in the presence of a radical polymerization initiator.

The terpolymers obtained by this process have the distinctive feature of being relaxors and of possessing electrostrictive properties. They may consequently be used for producing actuator systems, micropumps or capacitors.

They furthermore have a diffuse phase transition, a very narrow hysteresis loop, a high dielectric constant at ambient temperature and a relatively high strain.

These polymers must have a dielectric constant at least equal to 50, at room temperature, a high polarization, induced under an electric field, of at least 0.1 $C/m^2$, good electrical resistance which is expressed by a value of the electric breakdown field of less than 400 MV/m, which leads to a high electric energy storage density that rises to at least 10 $J/cm^3$ under 350 MV/m, an electric longitudinal strain which may reach 7% at 170 MV/m.

BACKGROUND OF THE INVENTION

Copolymers of this type were manufactured according to the process described in document EP 1 748 053. This process is carried out in an autoclave and in the presence of an initiator for initiating the polymerization reaction between the monomers.

The process described in the above document thus relates to the manufacture of copolymers comprising at least three monomers including vinylidene difluoride (VDF) and trifluoroethylene (TrFE) combined with at least one other monomer that is more reactive than the latter monomers.

This process comprises the following steps:
a) feeding a mixture of the three constituent monomers into a predefined reaction volume, said mixture being poor in reactive monomer,
b) as soon as the reaction is initiated, continuous reinjection at a constant pressure of a mixture of the constituent monomers, richer in the most reactive monomer, the composition of said mixture being determined in a known manner by calculation.

The tests carried out by the applicant made it possible to observe that this process had a certain number of drawbacks.

Specifically, it was observed that the copolymers obtained had properties which were sometimes not reproducible, since the reinjection carried out in the second step of the process only took place after the initiation of the polymerization reaction. However, it was observed that the duration of the initiation phase of the reaction was often imprecise, or even random.

Furthermore, it was observed that the presence, in the mixture of the initial feed, of one monomer that was more reactive than the other monomers, such as CFE, had a tendency to slow down the initiation phase of the reaction over time.

Moreover, it was observed that the implementation of the polymerization according to the process above resulted in a high fouling of the reactor, with the presence of crusts and skins both on the walls of the reactor and within the copolymer powder obtained. This phenomenon is even more pronounced when the polymerization temperature is high, which limits the possibilities of obtaining polymers that have very high molecular weights. This fouling of the reactor, both of its walls and within the powder, is evaluated on a scale having 4 levels numbered from 0 to 3 and characterized as follows:

Level 0:
  reactor clean after emptying and simple rinsing with a water jet,
  resin free of any crust or skin.
Level 1:
  presence of a friable coating on a minor portion of the reactor walls,
  slight film or coating on the stirrer spindle,
  clean thermometer well,
  powder with no or with very few aggregates or lumps.
Level 2:
  presence of a not very friable, or even hard, coating on a major portion of the reactor walls,
  fouled or encrusted stirrer spindle,
  film on the thermometer well,
  aggregates and bits of crust in the powder
Level 3:
  presence of a thick resistant film on the major portion of the surface of the reactor,
  highly encrusted stirrer spindle,
  blocks and filaments around the thermometer well,
  presence of numerous skins and crusts in the powder.

By using this scale for evaluating the fouling level after polymerization, level 1, 2 or 3 is attributed to polymerizations carried out according to the above process, whereas the process described in the present text makes it possible to regularly and reproducibly obtain level 0.

SUMMARY OF THE INVENTION

The objective of the present invention is to overcome the drawbacks of the known process above.

This objective is achieved, according to the invention, by virtue of a process for manufacturing terpolymers by polymerization in suspension:
  of VDF (vinylidene difluoride) monomers,
  of TrFE (trifluoroethylene) monomers, and
  of CFE (1-chloro-1-fluoroethylene) or CTFE (chlorotrifluoroethylene) monomers in the presence of a radical polymerization initiator.

BRIEF DESCRIPTION OF THE DRAWINGS

FIG. 1: schematically represents a plant for implementing the manufacturing process of the invention.

DETAILED DESCRIPTION OF THE INVENTION

Characteristically, the process according to the invention comprises the following steps:
i) an initial mixture of VDF and of TrFE, free of CFE and of CTFE, is fed into an autoclave, ii) the initiator mixed with water is injected into the autoclave so as to achieve, inside the autoclave, a pressure at least equal to 80 bar, in order to form a suspension of VDF and TrFE monomers in water, iii) a secondary mixture constituted of VDF, TrFE and CFE or CTFE is injected into the autoclave, then iv) as soon as the polymerization reaction starts, said secondary mixture is reinjected continuously into the reactor, so as to maintain therein a constant pressure of at least 80 bar.

Advantageously, the initial mixture has the following composition by weight:
- a proportion of VDF ranging from 25% to 95%, preferably from 55% to 80%;
- a proportion of TrFE ranging from 5% to 75%, preferably from 20% to 45%.

The secondary mixture has the following composition by weight:
- a proportion of VDF ranging from 20% to 80%, preferably from 35% to 70%;
- a proportion of TrFE ranging from 3% to 60%, preferably from 14% to 40%;
- a proportion of CFE or of CTFE from 4% to 67%, preferably from 7% to 34%.

Between the initial mixture and the secondary mixture, there is a weight ratio ranging from 0.4 to 2.

This process makes it possible to obtain terpolymers, the properties of which are more reproducible than those of the terpolymers obtained according to the known process described earlier on.

Furthermore, the implementation of the process is much simpler, in particular due to the fact that it does not depend on the duration of the initiation phase of the reaction which is often imprecise, or even random.

Moreover, the terpolymers obtained, even at high molecular weight, are in the form of powder, free of skins or crusts.

Preferably, inside the autoclave the pressure is between 80 and 110 bar and the temperature is maintained at a value between 40° C. and 60° C.

The secondary mixture of VDF, TrFE and CFE or CTFE is reinjected continuously into the autoclave, for example through a gate associated with a non-return valve.

The secondary mixture above, may be compressed using two compressors in series, before being reinjected into the autoclave. As is known, the secondary mixture is injected into the autoclave under a pressure greater than that prevailing in the autoclave, namely at values above 80 bar.

The terpolymer obtained according to the process of the invention is composed of x mol % of VDF, y mol % of TrFE and (100−x−y) mol % of CFE or CTFE, where:
- x is between 30 and 80, preferably between 40 and 70,
- y is between 5 and 60, preferably between 20 and 50,
- and where the sum of x and y is between 80 and 97, preferably between 90 and 95.

By way of example, the terpolymer obtained is composed of 61.8 mol % of VDF, 29.8 mol % of TrFE and 8.5 mol % of CFE.

The process according to the invention makes it possible to obtain terpolymers having an average molecular weight of greater than 400 000, as measured by viscometry. The terpolymers according to the invention are free of any crust or skin.

Other distinctive features and advantages of the intention will appear on reading the detailed description below.

The appended FIG. 1, given by way of nonlimiting example, schematically represents a plant for implementing the manufacturing process according to the invention.

This plant essentially comprises an autoclave 1 equipped with a stirrer 2, a heating mantle 3 and a thermostat 4. This autoclave 1 has, for example, an internal volume of 4 liters. Several pipes are connected to this autoclave 1, including a vacuum port pipe 5, a pipe 6 for introducing the initial gas mixture, a pipe 7 for injecting the initiator and a pipe 8 for injecting the secondary gas mixture and for reinjecting this mixture.

The pipe 6 is intended to be connected to a cylinder or two separate cylinders respectively containing VDF and TrFE under a pressure of around 2 to 3 bar.

The pipe 7 is connected to a water pump 9 that makes it possible to inject into the autoclave 1 a metered amount of initiator 10.

The pipe 8 is connected to a cylinder 11 or several separate cylinders respectively containing VDF, TrFE and CFE under a pressure of around 2 to 3 bar.

Connected in series between the cylinder 11 and the pipe 8 are two compressors 12, 13 intended to compress the gas exiting the cylinder 11 in order to inject it or reinject it into the autoclave 1.

Furthermore, the references 14, 15, 16 and 17 denote manometers for indicating the pressure.

The process according to the invention is carried out by means of the above plant according to a procedure described below by way of example.

Step i)

The initial mixture of VDF and of TrFE is introduced into the autoclave 1 via the pipe 6. In one embodiment, this feed is constituted of 463.34 g of VDF and 286.66 g of TrFE, i.e. a molar percentage of 67.43% of VDF and 32.57% of TrFE.

Step ii)

The initiator 10 is a radical initiator from the family of peroxydicarbonates. It is injected into the autoclave 1 via the pipe 7.

The water introduced into the autoclave 1 places the interior of this autoclave under a pressure greater than 80 bar and preferably between more than 80 and 100 bar.

The two monomers contained in the autoclave 1 reach the critical phase and are put into suspension in water.

Step iii)

The secondary mixture of VDF, TrFE and CFE contained in the cylinder or cylinders 11 is overpressurized by virtue of the two compressors 12, 13, is injected into the autoclave 1 by means of the pipe 8 and a gate 18 equipped with a non-return valve.

The secondary mixture above is injected into the autoclave 1 at a pressure slightly above the 80 bar prevailing inside the autoclave 1, preferably ranging from more than 80 bar to 110 bar.

The composition of the secondary mixture is, for example, equal to 606 g of VDF, 374.92 g of TrFE and 15.46 g of CFE, i.e. in moles: 57.01% of VDF, 27.53% of TrFE and 15.46% of CFE.

The temperature inside the autoclave 1 is maintained at a value between 45° C. and 52° C.

The polymerization reaction between the three monomers then starts. The polymerization, which has the effect of converting the monomers in suspension in water into solid powder, generates a pressure drop. This pressure drop has the effect of automatically reinjecting into the autoclave 1, continuously and at constant pressure, the mixture of the three monomers contained in the cylinder or cylinders 11.

The polymerization process then continues for a duration of around 5 hours. During this time, the pressure inside the autoclave 1 is maintained at a value above 80 bar and preferably between more than 80 and 100 bar. Similarly, the temperature is maintained between 45° C. and 52° C.

The yield of the conversion of monomers to terpolymer is of the order of 80 to 90%.

The terpolymer obtained after washing and drying is in the form of a white powder free of skins.

The terpolymer Obtained has the following molar composition:
VDF: 61.70%
TrFe: 29.80%
CFE: 8.50%

Its average molecular weight is equal to 413 000. It was measured by viscometry at 20° C. using methyl ethyl ketone as solvent.

This molecular weight may be greater than this value, by setting the temperature of the autoclave to a value above 52° C.

The above example may be repeated, replacing CFE with CTFE.

The invention claimed is:

1. A process for manufacturing terpolymers by polymerization of VDF (vinylidene difluoride), TrFE (trifluoroethylene), and CFE (1-chloro-1-fluoro-ethylene) or CTFE (chlorotrifluoroethylene) monomers in the presence of a radical polymerization initiator, said process comprising the following steps:
   i) feeding an initial mixture of VDF and of TrFE, free of CFE and of CTFE, into an autoclave,
   ii) injecting the initiator mixed with water into the autoclave so as to achieve, inside the autoclave, a pressure at least equal to 80 bar, in order to form a suspension of VDF and TrFE monomers in water,
   iii) injecting a secondary mixture constituted of VDF, TrFE and CFE or CTFE into the autoclave, then
   iv) reinjecting continuously said secondary mixture into the reactor, as soon as the polymerization reaction starts, so as to maintain therein a constant pressure of at least 80 bar,
   wherein the initial mixture has the following composition:
      a proportion of VDF ranging from 25% to 95%,
      a proportion of TrFE ranging from 5% to 75%.

2. The process as claimed in claim 1, in which the secondary mixture has the following composition by weight:
   a proportion of VDF ranging from 20% to 80%;
   a proportion of TrFE ranging from 3% to 60%;
   a proportion of CFE or of CTFE from 4% to 67%.

3. The process as claimed in claim 2, in which the secondary mixture has the following composition by weight:
   a proportion of VDF ranging from 35% to 70%;
   a proportion of TrFE ranging from 14% to 40%;
   a proportion of CFE or of CTFE from 7% to 34%.

4. The process as claimed in claim 1, in which the pressure inside the autoclave during steps ii) to iv) is at least 80 bar.

5. The process as claimed in claim 1, in which the temperature inside the autoclave is maintained at a value between 40° C. and 60° C.

6. The process as claimed in claim 1, in which the secondary mixture of VDF, TrFE and CFE or CTFE is reinjected continuously into the autoclave through a gate associated with a non-return valve.

7. The process as claimed in claim 1, in which the secondary mixture is compressed using two compressors in series, before being reinjected into the autoclave.

8. The process as claimed in claim 1, in which the terpolymer obtained is composed of x mol % of VDF, y mol % of TrFE and 100-x-y mol % of CFE or CTFE, where:
   x is between 30 and 80,
   y is between 5 and 60,
   and where the sum of x and y is between 80 and 97.

9. The process as claimed in claim 8, in which the terpolymer obtained is composed of 61.8 mol % of VDF, 29.8 mol % of TrFE and 8.5 mol % of CFE.

10. The process as claimed in claim 8, in which the terpolymer is obtained is composed of x mol % of VDF, y mol % of TrFE and 100-x-y mol % of CFE or CTFE, where:
    x is between 40 and 70,
    y is between 20 and 50,
    and where the sum of x and y is between 90 and 95.

11. The process as claimed in claim 1, in which the terpolymer obtained has an average molecular weight of greater than 400 000.

12. The process as claimed in claim 1, further comprising a step of utilizing said terpolymer for producing actuator systems, micropumps or capacitors.

13. The process as claimed in claim 1, in which the initial mixture has the following composition:
    a proportion of VDF ranging from 55% to 80%;
    a proportion of TrFE ranging from 20% to 45%.

* * * * *